(12) United States Patent
Leighnor et al.

(10) Patent No.: US 6,631,456 B2
(45) Date of Patent: Oct. 7, 2003

(54) HYPERCACHE RAM BASED DISK EMULATION AND METHOD

(76) Inventors: Lance Leighnor, 15612 Reeds, Overland Park, KS (US) 66223; Brian K. Spomer, 8040 Corinth, #201, Prairie Village, KS (US) 66208

(*) Notice: Subject to any disclaimer, the term of this patent is extended or adjusted under 35 U.S.C. 154(b) by 26 days.

(21) Appl. No.: 09/799,749

(22) Filed: Mar. 6, 2001

(65) Prior Publication Data

US 2002/0129204 A1 Sep. 12, 2002

(51) Int. Cl.[7] .............................................. H03M 13/00
(52) U.S. Cl. ....................... 711/170; 711/104; 711/105; 711/115; 711/118; 711/171; 711/173
(58) Field of Search ................................ 711/415, 104, 711/115, 118, 170, 171, 173, 105; 710/52, 56

(56) References Cited

U.S. PATENT DOCUMENTS

| | | | |
|---|---|---|---|
| 4,780,808 A | * 10/1988 | Moreno et al. ................ 711/4 |
| 4,896,262 A | * 1/1990 | Wayama et al. ............... 710/65 |
| 4,984,149 A | 1/1991 | Iwashita et al. ................ 711/4 |
| 5,070,474 A | 12/1991 | Tuma et al. ................... 703/24 |
| 5,077,737 A | * 12/1991 | Leger et al. .................... 714/6 |
| 5,131,089 A | 7/1992 | Cole ............................ 703/24 |
| 5,226,168 A | 7/1993 | Kobayashi et al. ........... 703/25 |
| 5,291,584 A | 3/1994 | Challa et al. ............... 707/202 |
| 5,493,574 A | * 2/1996 | McKinley ................... 714/773 |
| 5,778,418 A | 7/1998 | Auclair et al. ................ 710/65 |
| 6,311,193 B1 | * 10/2001 | Sekido ....................... 707/202 |

* cited by examiner

Primary Examiner—Than Nguyen
(74) Attorney, Agent, or Firm—Kyle L. Elliott; Blackwell Sanders Peper Martin, LLC

(57) ABSTRACT

A computer system (20) utilizes a monitor (24), keyboard (26), hard disk drive (28), processor (30), computer memory block (32), and memory based disk emulation device (22) to reduce access time for swap and paging files, thereby enhancing the computer system performance. The disk emulation device includes a device (22) manager (38) operable to select the number of logical drives, and a disk emulator (40) operable to cause actual memory devices (44–50) to appear as the virtual memory of the computer system disk drive (28). A memory controller (42) divides data bytes into data sets of two or four bits and saves the data sets simultaneously to the emulation memory devices (44–50). A backup battery (52) is provided to power the memory controller (42) and emulation memory devices (44–50) in the event of primary power supply failure.

20 Claims, 1 Drawing Sheet

HYPERCACHE RAM BASED DISK EMULATION AND METHOD

FIELD OF THE INVENTION

This invention relates to computer memory and data storage and, more particularly, to high speed memory used to emulate disk drive storage for paging and swap files.

BACKGROUND OF THE INVENTION

To operate at maximum efficiency, computers require large quantities of storage capacity in the form of hard disk drives, which will generally be referred to as storage. Computers also require large amounts of random access memory (RAM), which will generally be referred to as memory. As programs operate, frequently used files are stored in memory for quick access. That is, programs retrieve needed files from memory instead of from the body of the disk drive. These files are commonly known as cache files, and because memory has an access time in the range of 10 nanoseconds while disk drives have access times typically no faster than 5 milliseconds, computer operation is significantly enhanced. However, the architecture of most operating systems limits the amount of usable memory to approximately 96 megabytes. Thus, providing additional memory beyond 96 megabytes does not appreciably increase performance.

When the memory required for program operation exceeds available RAM, the computer creates a virtual memory area on the storage disk. Files known as paging or swap files are exchanged between the virtual memory and the actual memory. While the convenient location of the swap files on the disk drive achieves faster access times than would be possible if the files were stored on the main body of the disk drive, system performance is reduced because of the slower disk drive access time.

In the Windows NT platform, additional memory above 96 megabytes is utilized, but many applications default to the paging files by design. Thus, system performance is also limited by the access time of the disk drive.

BRIEF SUMMARY OF THE INVENTION

There is, therefore, provided in the practice of the invention a novel memory based disk emulation device, which reduces access time, to enhance system operation. The emulation device broadly includes an emulation memory device, a disk drive emulator, and a memory controller. The disk drive emulator makes the memory device appear as a disk drive unit to the computer system which has its own memory for cache files. The memory controller is operable to save the data to the emulation memory device.

In a preferred embodiment, four emulation RAM memory devices are provided, and the memory controller divides each byte of the data stream into four data sets of two bits each and saves the data sets in parallel to the memory devices. Each data set is then saved on the corresponding emulation memory device. Alternatively, the memory controller divides each byte into two data sets of four bits each if only two emulation memory devices are used. A device manager is provided, and is operable to set the number of logical drives into which the memory devices are divided. A backup power supply is operatively coupled with the memory controller to provide power to the memory controller and memory devices in the event of primary power failure.

It is further contemplated that the memory based disk emulation device will be used in a computer system having a housing which holds and protects a processor, disk drive, computer memory block, and controller. The computer system also includes a monitor and a keyboard.

It is further contemplated that the memory based disk emulation device will be used in a method for saving swap and paging files. The method includes emulating a disk drive's structure within the memory units thus allowing the emulation memory device to appear to the computer system as an additional physical disk drive. The page and swap file data sets are then saved within the corresponding memory units. The computer system continues the normal operation of saving cache files to computer memory.

In one preferred embodiment, the paging or swap files are divided, and four emulation memory devices are provided. Each byte in the data stream is divided into four sets of two bits each. Alternatively, two emulation devices are provided and the paging or swap file bytes are divided into two data sets of four bits each. As desired, the device manager divides the emulation memory devices into one or more logical drives.

Accordingly, it is an object of the present invention to provide an improved memory based disk emulation device for decreasing swap and page file access times, thereby enhancing computer system operation.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein.

DETAILED DESCRIPTION

Figure 1:
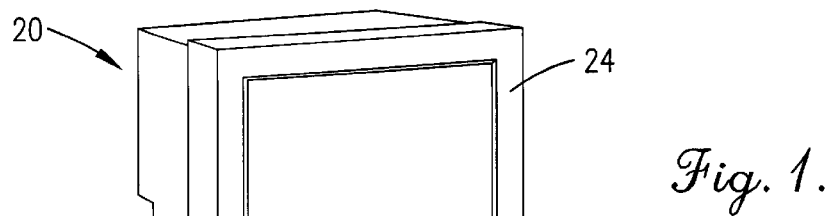
FIG. 1 is a schematic, prospective view of a computer system, utilizing a memory based disk emulation device according to the present invention.
Figure 2:
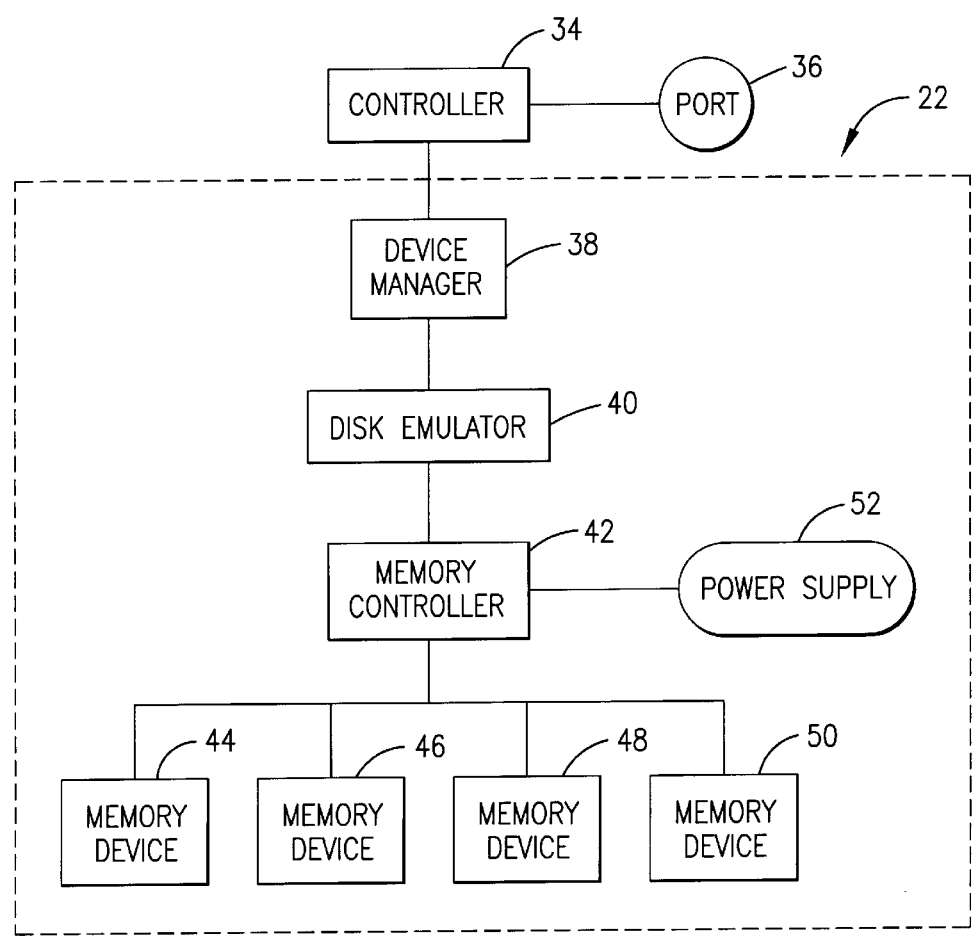
FIG. 2 is a block diagram of the memory based disk emulation device according to the present invention.

Referring to the drawings in greater detail, FIG. 1 shows a computer system 20, including a memory based disk emulation device 22 constructed in accordance with a preferred embodiment of the present invention. The computer system 20 also includes a monitor 24, keyboard 26, hard disk drive 28, processor 30, and computer memory block 32. The disk emulation device 22 operates as a much faster substitute for the virtual memory which is typically formed on the disk drive 28 and which is used for storage of swap and paging files. Because the access time of the memory based disk emulation device 22 is significantly less than the disk drive, the operation of the computer system 20 is appreciably enhanced.

The monitor 24, keyboard 26, disk drive 28, processor 30, and computer memory block 32 of the computer system 20 are generally conventional and are operatively coupled in a known manner to form the computer system. The computer system is also provided with a controller 34 for operative connection of the disk drive emulation device 22 with the computer system 20. The controller is preferably a small computer system interface (SCSI) or Integrated Drive Electronics (IDE) having additional ports 36 for connection of additional devices which may include additional disk emulation devices. The SCSI should be the fastest available because the disk drive speed does not limit the controller.

The disk drive emulation device 22 includes a device manager 38, disk emulator 40, memory controller 42, and an emulation memory device 44. In the preferred embodiment shown, the device includes four emulation memory devices 44, 46, 48, 50. Additionally, a backup power supply 52 is inoperative communication with the memory controller 42 and the emulation memory devices 44–50 to power the memory devices in the event of primary power failure. The power supply 52 is preferably a battery backup power supply.

The device manager 38, which may be provided by the SCSI controller, is operative to select the number of logical drives into which the memory devices will be partitioned. The device manager may cause the memory devices 44–50 to appear as one logical drive or as multiple logical drives. The partitioned drives can be the same or different sizes.

The disk emulator 40 comprises a read only (ROM) device having a software program thereon. The disk emulator is operable to make the emulation memory device or devices 44–50 appear as at least one disk drive unit to the computer system. The disk emulator preferably uses the emulation memory devices to appear as an actual disk drive in substantially all respects.

The memory controller 42 comprises a hardware controller having parallel computing capability designed to write data from the disk emulator to memory as fast as possible. The memory controller is operable to save data to the emulation memory device, and in an embodiment using two emulation memory devices, divide a data stream, including paging and swap files, into first and second data sets and save the first data set in the first memory device 44 and save the second data set in the second memory device 46. Preferably, the memory controller is operable to further divide the data stream into third and fourth data sets and save the third and fourth data sets on the third and fourth memory devices 48, 50, respectively. The memory controller is operative to automatically determine whether two or four data sets will be utilized. Alternatively, a user can configure the memory controller 42 to divide the data stream into two or four data sets for parallel operation or to simply save the data to one memory device or a selected one of the memory devices in a serial operation.

Preferably, each data set is of identical size, so that when two data sets are used, each byte in the data stream is split into four bits in each data set. When four data sets are used, each byte in the data stream is split into two bits in each data set. Each data set is saved substantially simultaneously to the respective memory devices. Thus, the memory based disk drive emulation device 22, according to the present invention, substantially reduces access time compared to normal swap and paging files which are saved in the virtual memory of the computer system disk drive 28. The emulation device 22 also reduces access time by saving the data in parallel to multiple memory devices. When the memory controller 42 utilizes two data sets, the emulation device 22 is twice as fast as using a single emulation memory device, and when the memory controller utilizes four data sets, the memory device 22 takes only one quarter the time of using a single emulation memory device.

The memory devices 44–50 preferably comprise random access memory (RAM). Specifically, the memory devices are static RAM, but dynamic RAM and synchronized dynamic RAM can also be utilized. Each memory device includes available amount of memory, and preferably each memory device includes at least 64 megabytes. However, memory devices with 256 megabytes, 512 megabytes, or larger are preferred. Additional memory devices can be added in parallel to increase the total amount of available memory to a gigabyte or larger. The minimum configuration would include 128 megabytes of memory and one memory device. Thus, the present invention contemplates an arrangement of 1 . . . n memory devices. Preferably, when more than one memory device is desired, multiple emulation devices with separate controllers would be installed or chained in the computer as is normal with SCSI and IDE systems. When the device manager 38 partitions the memory devices into more than one logic drive, preferably two memory devices are used for each logical drive. However, it s possible to use a single memory device for one logical drive and three memory devices for a second logical drive. Also, in one preferred embodiment, each logical drive is provided by a separate emulation device having a single memory device or bank of memory.

In operation of a program, cache files are saved in the computer memory block 32, and when the available memory in the computer memory block is exceeded, or when the program does so by design, swap/paging files are saved by the memory based disk emulation device 22. In one embodiment, the device manager 38 partitions the emulation memory device 44 into the desired number of logical drives, and the emulation memory device 44 is used to emulate the disk drive virtual memory. In another embodiment, each emulation device, if there is more than one, is potentially assigned as a different logical drive. The memory controller 42 saves the data to the emulation memory device. In the embodiment shown, the controller 42 divides the bytes of the data stream into an even number of data sets, as described above, and saves the data sets onto the corresponding emulation memory devices in parallel and substantially simultaneously. As the program continues to operate, the controller retrieves the data from the emulation memory devices as needed.

The memory based disk emulation device 22 according to the present invention enhances computer system operation by drastically reducing the access time over conventional virtual memory, and utilizes parallel computing capability to substantially simultaneously write all data. Further, the emulation device 22 also provides substantial operational enhancements over conventional disk emulators by virtue of computing which makes the emulation device 22 at least twice as fast as conventional disk emulators.

Thus, a memory based disk emulation device 22 is disclosed which utilizes emulation memory devices and parallel computing to simultaneously save multiple data sets to multiple emulation memory devices, thereby reducing access time and enhancing system performance. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A memory based disk emulation device for enhancing the performance of a computer system having computer memory by reducing access time, the device comprising:

an emulation memory device including an amount of available memory;

a disk drive emulator operable to make the emulation memory device appear as at least one disk drive unit to a computer system; and a memory controller operable to save data from a data stream in the emulation memory device and further operable to divide the data stream into first and second data sets.

2. The device according to claim 1 further comprising a second emulation memory device including a second amount of available memory, and wherein the disk drive emulator is further operable to make the second emulation memory device appear as a hard disk unit to the computer system, and the memory controller is further operable to divide the data stream into first and second data sets and save the first data set in the emulation memory device and save the second data set in the second emulation memory device.

3. The device according to claim 2 wherein the memory controller is operable to divide each byte in the data stream into four bits in the first data set and four bits in the second data set.

4. The device according to claim 2 further comprising a third emulation memory device including a third amount of available memory and a fourth emulation memory device including a fourth amount of available memory, and wherein the disk drive emulator is further operable to make the third and fourth emulation memory devices appear as hard disk units to the computer system and the memory controller is further operable to divide the data stream into third and fourth data sets and save the third data set in the third emulation memory device and save the fourth data set in the fourth emulation memory device.

5. The device according to claim 4 wherein the memory controller is operable to divide each byte in the data stream into two bits in the first data set, two bits in the second data set, two bits in the third data set, and two bits in the fourth data set.

6. The device according to claim 2 further comprising a device manager operable to set a number of logical drives for the memory devices, and wherein the emulator is operable to make the memory devices appear as multiple hard disk units to the computer system.

7. The device according to claim 1 further comprising a backup power supply operative to power the memory controller and the memory device in event of primary power failure, and a controller operable to interface with the computer system.

8. The device according to claim 7 wherein the controller comprises a small computer systems interface controller including additional ports for attachment of additional devices.

9. The device according to claim 1 wherein the memory device comprises random access memory.

10. A computer system comprising:
   a housing;
   a processor held in the housing;
   a monitor operatively coupled with the processor;
   a keyboard operatively coupled with the processor;
   a disk drive held in the housing and operatively coupled with the processor;
   a computer memory block operatively coupled with the processor; and
   a memory based disk emulation device including including:
      an emulation memory device;
      a disk drive emulator operable to make the memory device appear as a hard disk unit to the computer system; and
      a memory controller operable to save data from a data stream in the emulation memory device and further operable to divide the data stream into first and second data sets.

11. The system according to claim 10 further comprising a second emulation memory device including a second amount of available memory and wherein the disk drive emulator is further operable to make the second emulation memory device appear as a hard disk unit to the computer system and the memory controller is further operable to divide the data stream into first and second data sets and save the first data set in the emulation memory device and save the second data set in the second emulation memory device.

12. The device according to claim 11 wherein the memory controller is further operable to divide each byte in the data stream into 4 bits in the first data set and 4 bits in the second data set.

13. The system according to claim 11 further comprising a third emulation memory device including a third amount of available memory and a fourth emulation memory device including a fourth amount of available memory, and wherein the disk drive emulator is further operable to make the third and fourth emulation memory devices appear as hard disk units to the computer system and the memory controller is further operable to divide the data stream into third and fourth data sets and save the third data set in the third emulation memory device and save the fourth data set in the fourth emulation memory device.

14. The device according to claim 13 wherein the memory controller is operable to divide each byte in the data stream into 2 bits in the first data set, 2 bits in the second data set, 2 bits in the third data set, and 2 bits in the fourth data set.

15. The device according to claim 10 further comprising a second memory based disk emulation device including a second emulation memory device; a second disk drive emulator operable to make the second memory device appear as a hard disk unit to the computer system; and a second memory controller operable to save a data set to the second memory device.

16. A method for saving swap and paging files in a memory based disk emulation device for use in a computer system having computer memory, the method comprising:
   providing at least one disk emulator operable to make an emulation memory device appear as a disk drive unit;
   emulating a disk drive virtual memory with the emulation device;
   dividing data from a data stream into first and second data sets;
   saving a data set from a data stream on a emulation memory device; and
   saving cache files on the computer memory.

17. The method according to claim 16 further comprising dividing the data stream into first and second data sets, saving the second data set on a second emulation memory device, and saving the first data set on the emulation memory device.

18. The method according to claim 17 wherein saving the second data set comprises saving the second data set in parallel and substantially simultaneously with the first data set.

19. The method according to claim 18 further comprising dividing the data stream into third and fourth data sets, saving the third data set on a third emulation memory device, and saving the fourth data set on a fourth emulation memory device.

20. The method according to claim 19 further comprising partitioning the emulation memory device into multiple logical drives.

* * * * *

UNITED STATES PATENT AND TRADEMARK OFFICE
CERTIFICATE OF CORRECTION

PATENT NO. : 6,631,456 B2
DATED : October 7, 2003
INVENTOR(S) : Lance Leighnor and Brian K. Spomer It is certified that error appears in the above-identified patent and that said Letters Patent is hereby corrected as shown below:

Column 5,
Line 13, delete "divide the data stream into first and second data sets and".

Column 6,
Lines 11 and 51, "divide the data stream into first and second data sets and".

Signed and Sealed this

Twenty-third Day of December, 2003

JAMES E. ROGAN
*Director of the United States Patent and Trademark Office*